(12) United States Patent
Chen et al.

(10) Patent No.: US 9,014,908 B2
(45) Date of Patent: *Apr. 21, 2015

(54) MULTI-STAGE DIAGNOSTIC SYSTEM AND METHOD

(71) Applicant: Innova Electronics, Inc., Irvine, CA (US)

(72) Inventors: Ieon C. Chen, Laguna Hills, CA (US); Robert Madison, Eastvale, CA (US); Michael Nguyen, Norwalk, CA (US)

(73) Assignee: Innova Electronics, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,691

(22) Filed: Jan. 24, 2014

(65) Prior Publication Data

US 2014/0195101 A1 Jul. 10, 2014

Related U.S. Application Data

(63) Continuation of application No. 13/734,254, filed on Jan. 4, 2013, now Pat. No. 8,825,271.

(51) Int. Cl.
  G06F 17/30 (2006.01)
  G01M 17/00 (2006.01)
  G07C 5/00 (2006.01)
  (Continued)

(52) U.S. Cl.
  CPC .......... *G07C 5/008* (2013.01); *G06F 17/30398* (2013.01); *H04B 1/082* (2013.01); *G06F 17/30395* (2013.01); *G07C 5/0841* (2013.01); *H04L 67/04* (2013.01); *G06F 17/30507* (2013.01); *G07C 5/006* (2013.01); *H04W 88/02* (2013.01); *G06F 17/00* (2013.01); *G06F 17/30401* (2013.01); *G05B 23/0272* (2013.01); *G05B 23/0278* (2013.01);
  (Continued)

(58) Field of Classification Search
  CPC ...... G07C 5/0808; G07C 5/008; G07C 5/006; G07C 5/0841; G07C 2205/02; G06F 17/30507; G06F 17/30522; G06F 17/30398; G06F 17/30401; G06F 17/30395; G06F 17/00; H04L 67/04; G05B 23/0278; G05B 23/0272; H04W 88/02; H04B 1/082
  USPC .................................................. 701/29.1, 29.6
  See application file for complete search history.

(56) References Cited

U.S. PATENT DOCUMENTS 5,020,135 A * 5/1991 Kasparian et al. ............. 455/76
D334,560 S 4/1993 Wilson
(Continued)

OTHER PUBLICATIONS

SPX Corporation, Genisys Evo catalog, 2011, 8 pages.

*Primary Examiner* — Russell Frejd

(57) ABSTRACT

A multi-stage diagnostic system and related method which seeks diagnostic information from a secondary information source when a first information source does not yield sufficient data for producing a diagnostic result. In particular, diagnostic process includes a first stage of communicating with an onboard vehicle computer to retrieve diagnostic trouble codes therefrom. If diagnostic trouble codes are received from the onboard computer, the diagnostic trouble codes are used to produce a diagnostic result. On the other hand, if no diagnostic trouble codes are retrieved from the onboard computer, the diagnostic process proceeds to a second stage wherein symptomatic diagnostic information is solicited from the user. A series of symptomatic questions may be presented to the user on a smartphone.

20 Claims, 5 Drawing Sheets

(51) Int. Cl.
  *G07C 5/08* (2006.01)
  *H04L 29/08* (2006.01)
  *G06F 17/00* (2006.01)
  *G05B 23/02* (2006.01)
  *H04B 1/08* (2006.01)
  *H04W 88/02* (2009.01)
  *G05B 23/00* (2006.01)

(52) U.S. Cl.
  CPC ..... *G07C 2205/02* (2013.01); *G06F 17/30522* (2013.01); *G05B 23/00* (2013.01); *G07C 5/0808* (2013.01)

(56) References Cited

U.S. PATENT DOCUMENTS

| | | |
|---|---|---|
| 5,347,211 A | 9/1994 | Jakubowski |
| D377,622 S | 1/1997 | Chen |
| 5,635,841 A | 6/1997 | Taylor |
| 5,758,300 A | 5/1998 | Abe |
| 5,767,681 A | 6/1998 | Huang |
| 5,794,164 A * | 8/1998 | Beckert et al. ............... 455/3.06 |
| 5,809,437 A | 9/1998 | Breed |
| 5,859,628 A | 1/1999 | Ross et al. |
| 5,884,202 A | 3/1999 | Arjomand |
| 6,000,413 A | 12/1999 | Chen |
| 6,055,468 A | 4/2000 | Kaman et al. |
| 6,094,609 A | 7/2000 | Arjomand |
| 6,169,943 B1 | 1/2001 | Simon et al. |
| 6,225,898 B1 | 5/2001 | Kamiya et al. |
| 6,263,268 B1 | 7/2001 | Nathanson |
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothshink |
| 6,587,768 B2 | 7/2003 | Chene et al. |
| 6,611,740 B2 | 8/2003 | Lowrey et al. |
| 6,650,318 B1 | 11/2003 | Arnon |
| 6,732,031 B1 | 5/2004 | Lightner et al. |
| 6,738,697 B2 * | 5/2004 | Breed ............... 701/31.5 |
| 6,768,935 B1 * | 7/2004 | Morgan et al. ............... 701/29.6 |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,089,099 B2 * | 8/2006 | Shostak et al. ............... 701/29.6 |
| 7,103,460 B1 * | 9/2006 | Breed ............... 701/32.9 |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D558,621 S | 1/2008 | Rich et al. |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,409,317 B2 * | 8/2008 | Cousin et al. ............... 702/183 |
| 7,421,321 B2 * | 9/2008 | Breed et al. ............... 701/33.6 |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,584,074 B2 * | 9/2009 | Cousin et al. ............... 702/183 |
| 7,603,293 B2 | 10/2009 | Chen |
| 7,620,484 B1 * | 11/2009 | Chen ............... 701/31.5 |
| D610,586 S | 2/2010 | Chen |
| 7,698,104 B2 * | 4/2010 | Cousin et al. ............... 702/183 |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,904,219 B1 | 3/2011 | Lowrey et al. |
| 7,974,750 B2 | 7/2011 | Namaky |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,131,417 B2 * | 3/2012 | Picard ............... 701/31.4 |
| 8,301,329 B2 | 10/2012 | Andreasen |
| 8,306,687 B2 | 11/2012 | Chen |
| 8,370,018 B2 | 2/2013 | Andreasen et al. |
| 8,548,674 B2 * | 10/2013 | Namaky ............... 701/32.8 |
| 8,630,765 B2 | 1/2014 | Chen |
| 2002/0007237 A1 | 1/2002 | Phung et al. |
| 2003/0171111 A1 | 9/2003 | Clark |
| 2004/0110472 A1 | 6/2004 | Witkowski |
| 2004/0227523 A1 | 11/2004 | Namaky |
| 2005/0192727 A1 * | 9/2005 | Shostak et al. ............... 701/37 |
| 2009/0276115 A1 | 11/2009 | Chen |
| 2011/0071720 A1 * | 3/2011 | Schondorf et al. ............... 701/30 |
| 2011/0123039 A1 * | 5/2011 | Hirschfeld et al. ............... 381/86 |
| 2011/0224866 A1 | 9/2011 | Chen |
| 2011/0264322 A1 | 10/2011 | Chen |
| 2011/0307144 A1 * | 12/2011 | Wu et al. ............... 701/31 |
| 2012/0010775 A1 | 1/2012 | Chen |
| 2012/0130844 A1 * | 5/2012 | Picard ............... 705/26.4 |
| 2012/0215398 A1 | 8/2012 | Chen |
| 2014/0046800 A1 | 2/2014 | Chen |
| 2014/0052328 A1 | 2/2014 | Nguyen |

* cited by examiner

MULTI-STAGE DIAGNOSTIC SYSTEM AND METHOD

CROSS-REFERENCE TO RELATED APPLICATIONS

This is a continuation-in-part application of U.S. application Ser. No. 13/734,254, filed Jan. 4, 2013, now U.S. Pat. No. 8,825,271, the contents of which are expressly incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates to a smart phone application, and more specifically, a smart phone application for facilitating symptomatic diagnosis of a vehicle in response to an indication that there are no diagnostic trouble codes present in an onboard vehicle computer.

2. Description of the Related Art

Automobiles are a common means of transportation in regions throughout the world. In this regard, automobiles may be used for local, day-to-day transportation, or for traveling to more far-reaching destinations.

Automobiles are sophisticated machines comprised of cooperative electrical, mechanical and fluid components. Although automobiles are designed to operate for long periods of time between routine maintenance and checkup, breakdowns may occur at any moment. For those drivers using their automobile for local transportation, a breakdown may be quickly remedied by visiting a local mechanic or repair shop. However, if an automobile breaks down while in a remote location, it may be more difficult to resolve the problem.

For instance, the driver may be required to call an unknown tow-service to have the automobile to a nearby repair shop. Once at the repair shop, the driver is oftentimes in a vulnerable position since the driver cannot diagnose the automobile problem by himself and thus, must rely on the opinion of the mechanic. The mechanic may be misleading as to the true nature of the problem, as well as the cost associated with fixing the problem.

Various devices have been developed to arm the driver with objective diagnostic information regarding the health of their vehicle. For instance, diagnostic scan tools are devices which typically connect with an onboard vehicle computer to retrieve diagnostic trouble codes therefrom. The diagnostic trouble codes may be uploaded to a diagnostic database for analysis for determining a possible diagnostic solution.

Although such devices are typically powerful automotive diagnostic tools, drivers oftentimes do not have access to diagnostic equipment when a vehicle breaks down. For instance, one family may own one diagnostic scan tool for use with several vehicles, such that if any of the vehicles not including the diagnostic scan tool breaks down, the tool may not be available as a resource.

Recognizing this deficiency, there is a need in the art for a diagnostic system which utilizes equipment readily accessible to a driver, should a breakdown occur. One device commonly carried or kept in close proximity to many individuals is a smart phone, which is a handheld electronic device capable of communicating over a cellular telephone network. Smart phones are also typically include data processing and display capabilities, which allows smart phones to be used for a wide range of functions beyond simply making phone calls.

Therefore, there is a need in the art for an automotive diagnostic system which utilizes the capabilities smart phone to retrieve symptomatic information from a user/driver and upload such information to a diagnostic database. As described below, the present invention addresses these and other improvements to contemporary vehicle authentication and diagnostic prediction systems.

BRIEF SUMMARY OF THE INVENTION

There is provided a multi-stage diagnostic system and related method which seeks diagnostic information from a secondary information source when a first information source does not yield sufficient data for producing a diagnostic result. In particular, diagnostic process includes a first stage of communicating with an onboard vehicle computer to retrieve diagnostic trouble codes therefrom. If diagnostic trouble codes are received from the onboard computer, the diagnostic trouble codes are used to produce a diagnostic result. On the other hand, if no diagnostic trouble codes are retrieved from the onboard computer, the diagnostic process proceeds to a second stage wherein symptomatic diagnostic information is solicited from the user. A series of symptomatic questions may be presented to the user on a hand held electronic device (e.g., smartphone, tablet computer, etc.).

According to one embodiment, there is provided a system for providing diagnostics for a vehicle having an onboard computer using a hand held electronic device. The system includes a scan tool disposable in operative communication with the onboard computer for retrieving diagnostic trouble codes therefrom. The system further includes a diagnostic database having diagnostic solutions matched with symptomatic data. A set of computer executable instructions is downloadable onto the hand held computing device for configuring the hand held electronic device to: establish communication between the hand held electronic device and the scan tool, display a symptomatic question sequence for the user when there is no diagnostic trouble code received from the onboard computer, store symptomatic data received from the user, and communicate the symptomatic data to the diagnostic database. The diagnostic database is configured to match symptomatic data received from the hand held electronic device with a diagnostic solution.

The symptomatic question sequence may include a first question and a second question, wherein the content of the second question depending on user input received in response to the first question.

The computer executable instructions may additionally configure the hand held electronic device to display a symptomatic question sequence that is customized in accordance with vehicle identification information associated with the vehicle. The scan tool may be configured to retrieve vehicle identification information from the onboard computer. The vehicle identification information may include a vehicle identification number or license plate information.

The computer executable instructions may further configure the smart phone to receive information associated with the diagnostic solution from the diagnostic database, and display the information associated with the diagnostic solution. The information associated with the diagnostic solution includes a cost of repair statement. The computer executable instructions may further configure the hand held electronic device to establish wireless communication with the scan tool.

The system may additionally include a hand held electronic device configured to retrieve vehicle identification information from the vehicle. The hand held electronic device may include a camera configured to capture an image or video of a portion of the vehicle, wherein the hand held electronic device is loaded with a set of executable instructions effect to derive the vehicle identification information from the captured image or video. The camera may also include a microphone for capturing sound associated with operation of the vehicle. The hand held electronic device may include a smart phone.

The diagnostic database may be located on the hand held computing device, or alternatively, on a computer server.

According to another aspect of the invention, there is provided a set of computer executable instructions downloadable onto the hand held computing device for configuring the hand held electronic device to: display a symptomatic question sequence for the user in response to an indication that there is no diagnostic trouble code identified as being present in the onboard computer, store symptomatic data received from the user, and communicate the symptomatic data to the diagnostic database.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
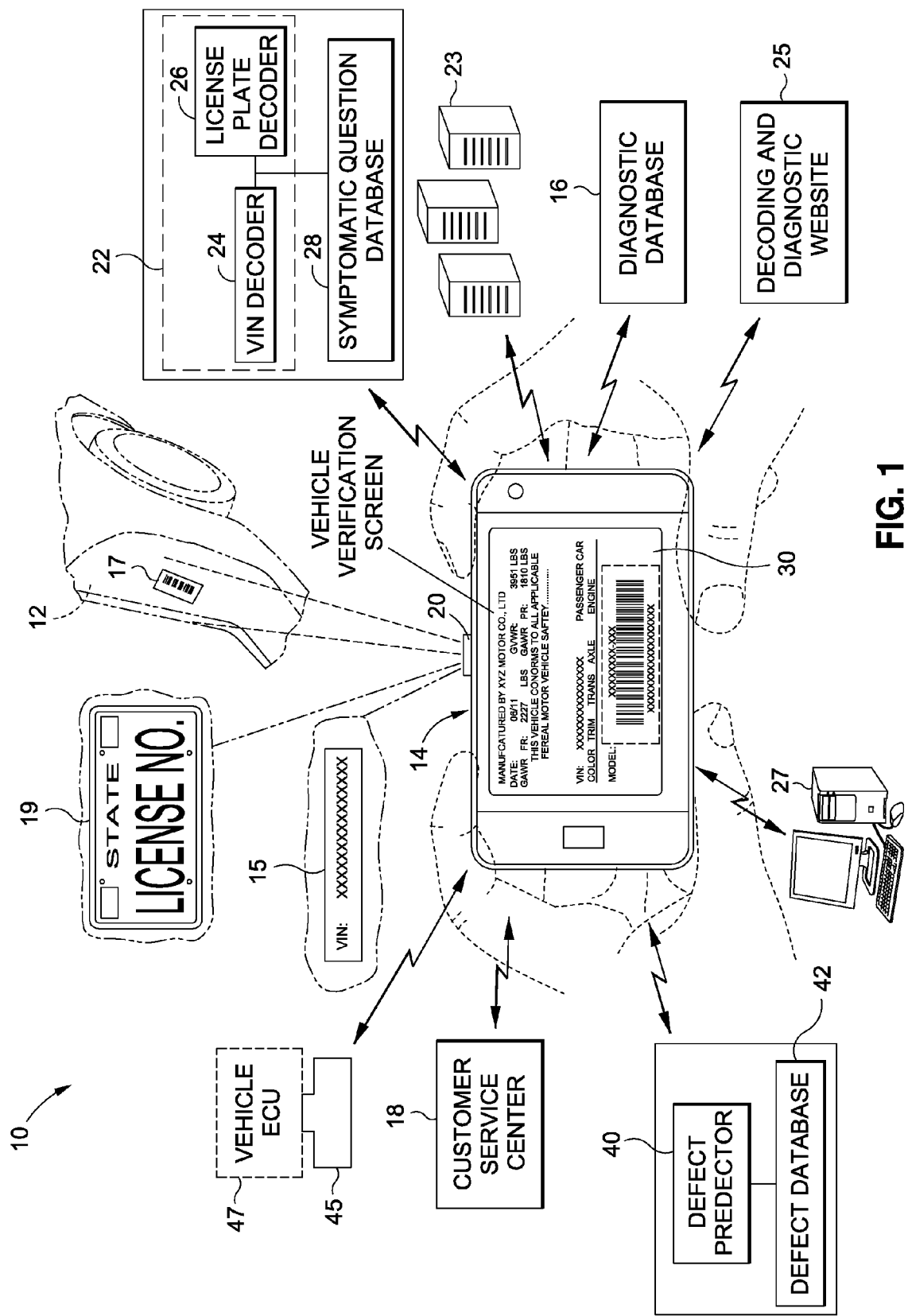
FIG. 1 is a schematic overview of an embodiment of a smart phone based vehicle verification and predictive diagnostic system.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for purposes of illustrating a preferred embodiment of the present invention only, and are not for purposes of limiting the same, there is shown a symptomatic diagnostic system 10 for diagnosing a vehicle 12 using vehicle identification information, such as the vehicle identification number (VIN) or license plate information, to generate vehicle specific symptomatic questions for display on the user's smart phone 14. The symptomatic question sequence may vary from vehicle to vehicle, and may be developed based on historical diagnostic records for similar vehicles. In this regard, the symptomatic questions sequence is "intelligent" insofar as the questions may be vehicle-specific and may be based on continually-updated historical diagnostic records. The symptomatic questions may be displayed on the smart phone 14 and the user may enter the answers to the symptomatic questions into the smart phone, which may upload the answers to a remote diagnostic database 16 or a customer service center 18. The user's answers may be used to determine a probable diagnosis and to identify a most likely fix to the probable diagnosis.

The smart phone based system 10 provides vehicle specific diagnostic support in isolated and remote locations. For instance, if a user is experiencing vehicle problems while on a long road trip, the user may utilize the system 10 to obtain advanced diagnostic support without having to visit a mechanic's garage or repair shop. In this regard, the advanced diagnostic support may be accessible wherever the user's smart phone can communicate with the remote diagnostic database 16 and/or customer service center 18. Moreover, if the user does visit a mechanic, the user may be armed with the objective assessment obtained from the diagnostic system 10 to keep the mechanic honest.

Referring now specifically to FIG. 1, there is shown an embodiment of the vehicle-specific symptomatic diagnostic system 10 which utilizes the smart phone 14 as a central hub of information. As used herein, the term "smart phone" may refer to a handheld electronic device having an input, a display and the capability of communicating over a wireless communication network. Exemplary smart phones include the Apple iPhone®, the RIM Blackberry®, and the Galaxy Nexus®. It is also contemplated that the term "smart phone" may encompass tablet computers, such as the Apple iPad® or the Microsoft Surface®, or other handheld electronic devices known by those skilled in the art.

The smart phone 14 is used to optically capture vehicle identification information associated with the vehicle 12. Those skilled in the art will readily appreciate that most smart phones 14 include a camera 20. The camera 20 is used to capture an image of vehicle identification information associated with the vehicle, such as the VIN 15 or license plate 19. The VIN may be displayed in various locations throughout the vehicle, such as under the windshield or in the door panel. It is also contemplated that the VIN may be associated with a bar code 17 attached to the vehicle. The camera 20 may capture an image of the bar code 17 or scan the bar code 17 to decode the bar code 17 to obtain the VIN. The camera 20 may also capture a video of the vehicle 12 to allow for identification thereof, as well as sound associated with operation of the vehicle 12.

It is also contemplated that in other embodiments, the vehicle identification information may be manually entered into the smart phone 14. In yet another embodiment, the smart phone 14 may be disposable in wireless communication with an onboard vehicle computer to receive vehicle information therefrom. For instance, the onboard vehicle computer may emit a wireless signal including the electronic VIN associated with the vehicle 12.

After the vehicle identification information is obtained by the smart phone 14, the vehicle identification information is uploaded to a vehicle decoder 22 to determine vehicle characteristic information based on the vehicle identification information. The vehicle characteristic information may include, but is not limited to the vehicle year, make, model, and engine type.

According to one embodiment, the vehicle decoder 22 is located remotely from smart phone 14 such that the image of the vehicle identification information is communicated from the smart phone 14 to the remote vehicle decoder 22 via wireless communication means, such as via a cellular telephone network. For instance, the remote vehicle decoder 22 may be located on a server 23, a personal computer 27, or other remote computing devices. In another embodiment, the vehicle decoder 22 is stored locally on the smart phone 14, in which case, the vehicle identification information may be communicated from the camera 20 to the vehicle decoder 22 within the smart phone 14. The vehicle decoder 22 may extract or determine information based on a photograph of the vehicle's YIN 15 or license plate 19. For instance, the vehicle decoder 22 may identify the specific alphanumeric characters included in the image of the YIN 15 or license plate, which in turn may be used to determine the vehicle characteristic information.

In one embodiment, the vehicle decoder 22 is a YIN decoder 24 which derives vehicle characteristic information from the vehicle's YIN. In this regard, the various alphanumeric characters included in the YIN may be used to determine the vehicle characteristic information. The YIN decoder 24 may include a YIN decoding database or lookup table which vehicle characteristic information correlated to alphanumeric characters included in the YIN. In another embodiment, the vehicle decoder 22 is a license plate decoder 26 and derives the vehicle characteristic information from the license plate. In this regard, the license plate decoder 26 may have access to one or more government databases having stored vehicle characteristic information correlated with license plate information.

Once the vehicle characteristic information is determined by the vehicle decoder 22, a signal including the vehicle characteristic information is sent to the symptomatic question database 28. The symptomatic question database 28 includes symptomatic questions organized according to vehicle characteristic data. For instance, the symptomatic questions for a 2008 HONDA ACCORD® may differ from the symptomatic questions for a 2008 TOYOTA CAMRY®. Thus, the symptomatic questions may be vehicle specific, depending on the year, make, model, engine type or other vehicle characteristic.

As used herein, "symptomatic questions" are questions which may be presented to the user to diagnose a potential vehicle problem based on a user's characterization of vehicle symptoms or defects. The symptomatic question sequence may include a comprehensive, multi-level series of questions which become more specific based on the user's answers. In this regard, the symptomatic questions may be presented to the user to trouble-shoot the vehicle problems based on questions answered by the user.

The symptomatic question sequence may begin with simple, closed-ended questions presented in a multiple choice format. For instance, a general question which may be initially asked to the user may be: "What appears to be the nature of the problem? A) Mechanical or B) Electrical." If the user selects "A) Mechanical," a series of follow up questions may include, "What type of symptom(s) are you experiencing? A) Irregular Smell, B) Irregular Sound, C) Irregular Sight (i.e., smoke), D) Irregular Feel (i.e., vibration)." "Where is the irregular sound coming from? A) Front—Driver's Side, B) Front—Passenger's Side, C) Rear—Driver's Side, D) Rear—Passenger's Side." "When do you hear the sound? A) When the car is in park, B) When the car is moving." "Does the sound occur when you press the brakes? A) Yes, B) No." Those skilled in the art will readily appreciate that the questions presented above are exemplary in nature only and are not intended to limit the scope of the present invention.

The answers selected by the user may be stored in the smart phone 12 and then uploaded to the remote diagnostic center 16. The answers may be matched with databases at the remote diagnostic center 16 and/or may be reviewed by diagnostic personnel, i.e., mechanics, to determine a possible diagnostic solution.

The symptomatic questions may be derived from historical information related to vehicle fixes for vehicle sharing similar vehicle characteristic information. In particular, the content of the symptomatic questions and the order of the symptomatic questions may be arranged based on historical data. According to a preferred implementation of the present invention, the symptomatic questions are updated in the database 28 by a network of mechanics or automotive professionals based on their experience in diagnosing vehicles having certain vehicle characteristics.

Figure 2:
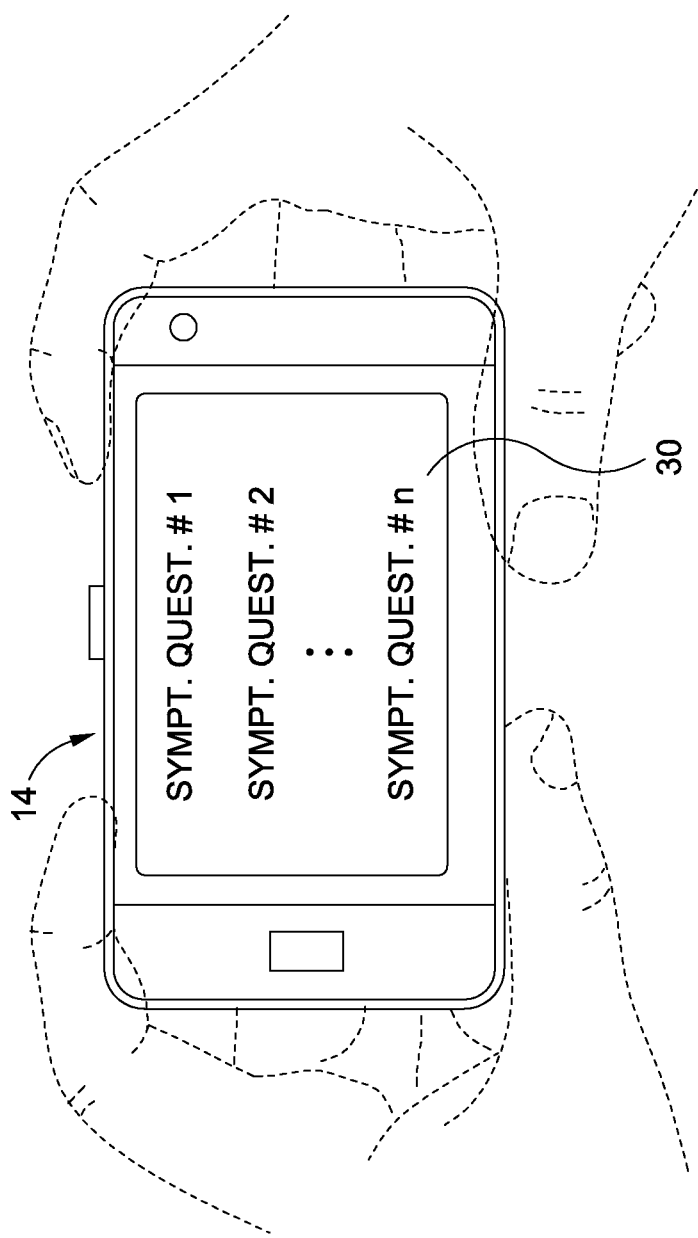
FIG. 2 is a schematic view of a smart phone listing a series of symptomatic questions.

The symptomatic question(s) are communicated from the symptomatic question database 28 to the smart phone 14 for display on the smart phone display 30 (see FIG. 2). In one embodiment, the questions are downloaded onto the smart phone 14 for display on the smart phone 14, while in another embodiment, the questions are hosted on a website accessible by the smart phone 14.

The symptomatic questions sequence may be static, i.e., wherein the content and sequence of questions are generated irrespective of the user's answers, or dynamic, i.e., wherein the content and/or sequence of questions are generated in response to the user's answers. In other words, the symptomatic question sequence may include at least a first question and a second question, wherein the content of the second question depends on user input received in relation to the first question.

According to one embodiment, the symptomatic question database 28 is located remote from the smart phone 14. It is contemplated that the symptomatic question database 28 may store vast amounts of data and require routine updating, and thus, it may be beneficial to have the symptomatic question database 28 located remote from the smart phone 14, which may not have the internal capacity to store such large amounts of data. For instance, the symptomatic question database 28 may be located on the server 23, personal computer 27, or other remote computing devices. However, it is contemplated that other embodiments may include a symptomatic question database 28, or at least a portion thereof, that is stored locally within the smart phone 14. Along these lines, once the vehicle characteristic information is determined, information from the symptomatic question database 28 corresponding to the vehicle characteristic information may be downloaded to the smart phone 14.

The symptomatic questions are displayed on the smart phone display 30 and the user answers the questions using the smart phone input device(s). In this regard, the user's answers may be entered via a touch screen or keypad. It is also contemplated that the smart phone 14 may be configured to detect verbal answers from the user. The user's answers to the symptomatic questions will be referred to herein as "symptomatic data."

The symptomatic data received by the user is communicated to the diagnostic database 16, which includes diagnostic solutions matched with symptomatic data. The diagnostic database 16 is organized according to vehicle characteristic information. In this regard, the diagnostic database 16 matches the symptomatic data received from the smart phone 14 with a diagnostic solution corresponding to the vehicle characteristic information of the vehicle under consideration. The diagnostic database 16 may be located remotely from the smart phone 14, such as on the server 23, the personal computer 27, or other remote computing devices. Alternatively, the diagnostic database 16 may be located on the smart phone 14.

Figure 3:
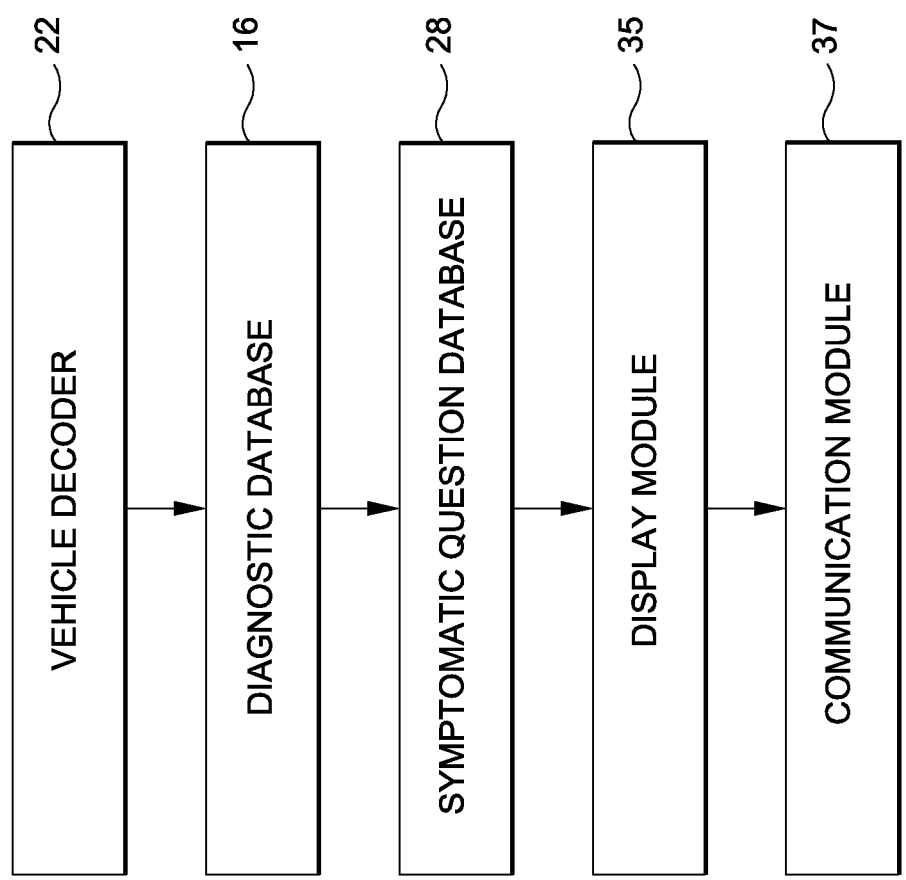
FIG. 3 is a schematic view of an embodiment of a symptomatic diagnostic smart phone application for use with a smart phone.

According to one embodiment, the functions executed by the smart phone 14 may be implemented by a computer executable instructions (i.e., a smart phone application or app.) which is downloadable onto the smart phone 14. Referring now specifically to FIG. 3, there is shown a schematic view of an embodiment of the smart phone app. which is downloadable onto the smart phone 14. In the exemplary embodiment, the smart phone app. includes the vehicle decoder 22, diagnostic database 16, symptomatic question database 28, a display module 35, and a communications module 37. Those skilled in the art will readily appreciate that the smart phone app. shown in FIG. 3 is exemplary in nature only and that not all embodiments of the smart phone app. may include all of the components depicted in FIG. 3. Furthermore, additional components may be added to the smart phone app. without departing from the spirit and scope of the present invention.

It is also contemplated that the computer executable instructions may configure the smart phone 14 to perform other functions. For instance, the smart phone may be able to extract/determine vehicle identification information from a photograph of the YIN or license plate. The determined vehicle identification information may be used by the vehicle decoder 22 to derive the vehicle characteristic information.

The smart phone app. may further configure the smart phone 14 to receive the diagnostic solution from the diagnostic database 16 and display the diagnostic solution on the smart phone display 30. Once the diagnostic solution is displayed, the user may take appropriate action to either implement the diagnostic solution or seek help from a mechanic.

Figure 4:
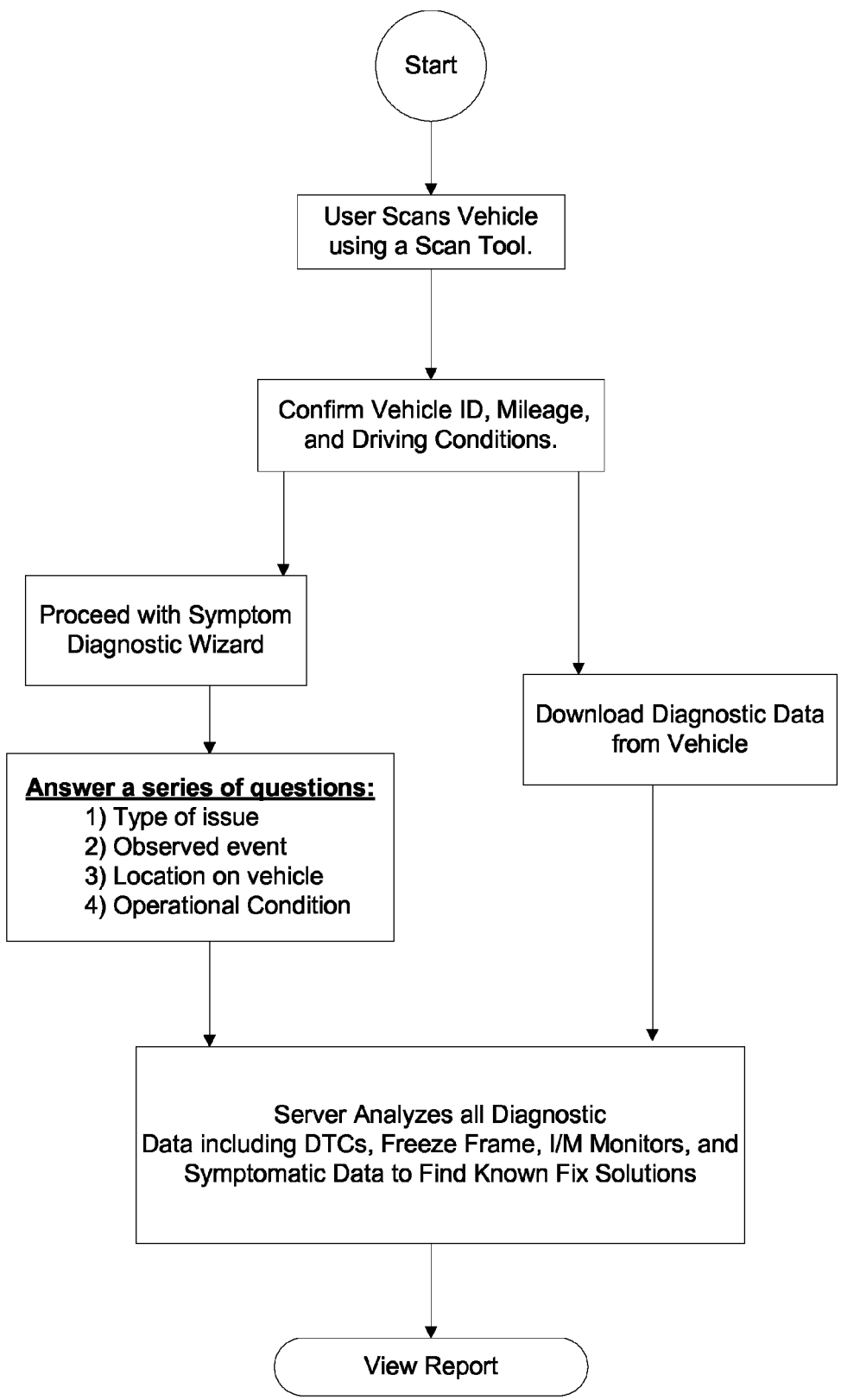
FIG. 4 is a flow chart of a method using diagnostic data and symptomatic data in combination with each other to determine a diagnostic solution.

It is contemplated that the various aspects of the present invention are related to determining a diagnostic solution based solely on the symptomatic data provided by the user. However, other aspects of the invention relate to utilizing diagnostic data retrieved from the vehicle, along with the symptomatic data, to determine the diagnostic solution. In this respect, the diagnostic data retrieved from the vehicle may include, but is not limited to, DTCs, freeze frame data, live data, I/M monitors, or other data known or later developed in the art. An exemplary process of using diagnostic data received from the vehicle, e.g., DTCs, in combination with symptomatic data is illustrated in the flowchart shown in FIG. 4. In this regard, the vehicle diagnostic data may be used to verify a diagnostic solution derived solely from symptomatic data, or the vehicle diagnostic data may be used in conjunction with the symptomatic data to determine the best or most likely diagnostic solution from a list of possible diagnostic solutions.

Accordingly, in one embodiment, the smart phone app. configures the smart phone 14 to receive vehicle diagnostic data and upload the vehicle diagnostic data to the diagnostic database 16. The vehicle diagnostic data may be communicated from a code reader 45, which communicates with the vehicle ECU 47. The code reader 45 may have the communication capabilities to poll the vehicle ECU 47 to determine the proper communication protocols for retrieving information from the ECU 47. The code reader 45 may also have storage capabilities to store the protocol information, as well as diagnostic data retrieved from the vehicle. Vehicle data retrieved by the code reader 45 may be communicated to the smart phone 14, preferably by wireless communication. In this regard, the code reader 45 may have a built-in wireless communication circuit, or alternatively, the code reader 45 may be configured to be connectable with a wireless communication adapter for wirelessly communicating vehicle data to the smart phone 14. It is also contemplated that the code reader 45 may be configured to communicate the vehicle data retrieved from the ECU 47 via wired communication means. Although the code reader 45 is configured to communicate information to the smart phone 14, various embodiments of the code reader 45 are configured to operate independent of the smart phone 14. In this regard, the code reader 45 may poll the ECU 47, retrieve diagnostic data from the ECU 47, store the data, and upload data to the diagnostic database 16 independent of the smart phone 14.

Certain embodiments of the code reader 45 may be more sophisticated and include a user interface including a local display for displaying diagnostic data (i.e., diagnostic trouble codes, freeze frame data, live data, etc.) retrieved from the vehicle. The user interface may also include a user input(s) for allowing a user to make selections or navigate through information. In another embodiment, the code reader 45 is less sophisticated and does not include a user interface, and simply includes the capability to interface the smart phone 14 with the vehicle ECU 47. In this regard, a less sophisticated code reader 45 would have the capability to communicate with the ECU 47, store vehicle data, and upload that data to the smart phone 14.

Any information retrieved by the code reader 45 and communicated to the smart phone 14 may be uploaded to the diagnostic database 16, which may be configured to receive the diagnostic data and make a diagnostic determination based on the vehicle diagnostic data and the symptomatic data. As indicated above, the code reader 45 may operate independent of the smart phone 14, and retrieve and upload data to the database 16 independent of the smart phone 14. In this regard, according to one embodiment the smart phone 14 is simply used to display symptomatic questions and retrieve symptomatic data from the user, and upload the symptomatic data to the database 16. The symptomatic questions may be initiated by the user (i.e., opening the app.) or alternatively, the database 16 may communicate a signal to the smart phone 14 to initiate the symptomatic questioning in response to receipt of diagnostic information from the code reader 45.

The code reader 45 may also be able to retrieve an electronic YIN from the vehicle ECU 47, wherein the electronic YIN may be used to determine the vehicle characteristic information, as described in more detail above.

Although one feature of the present invention relates to determining a diagnostic solution based, at least in part, on symptomatic data, one step in the diagnostic process is to determine vehicle characteristic information. It is contemplated that once the vehicle characteristic information is determined, additional information which may be useful to the user may be easily obtained. For instance, in one embodiment, the vehicle characteristic information may be used to make a diagnostic prediction of the vehicle. More specifically, the diagnostic predication may include a summary of likely failures or repairs for the vehicle, and the mileage at which those failures or repairs will likely occur. Thus, the predictive diagnostic feature may provide the user with an estimate as to the health of the vehicle and the cost for operating and maintaining the vehicle in the future. For a more comprehensive discussion on predictive diagnostics, please refer to U.S. patent application Ser. No. 13/589,532, entitled Predictive Diagnostic Calculation, owned by Innova Electronics Inc. of Irvine, Calif., and the contents of which are expressly incorporated herein by reference.

The diagnostic prediction feature includes a defect predictor 40 which compares the vehicle characteristic data (i.e., the determined year, make, model, etc.) associated with the vehicle with information in a historical defect database 42 to make the diagnostic prediction. The diagnostic prediction may be summarized as being a LOW, MEDIUM or HIGH probability of failure, and may relate to the vehicle as a whole, or a particular component, within a certain mileage range.

The defect database 42 includes information related to defects that have occurred in different vehicles and the reference mileage at which such defects occurred. The defector predictor 40 is in communication with the vehicle decoder 22 and the defect database 42 and is configured to identify defects listed in the defect database 42 corresponding to vehicles having similar characteristic information to the vehicle.

According to one embodiment, the defect database 42 includes the reference mileage associated with each identified associated defect. In this regard, the smart phone app may further configures the smart phone to prompt the user to enter the mileage of the vehicle and communicate the entered mileage to the defect predictor 40. The defect predictor 40 may be further configured to restrict the identified defects to defects that have occurred within a mileage bracket that substantially corresponds to the current mileage of the vehicle.

For more information related to defect prediction, please see U.S. patent application Ser. No. 13/569,522 entitled Smart Phone App-Based Method and System of Collecting Information for Purchasing Used Cars, filed Aug. 8, 2012 and owned by Innova Electronics Inc. of Irvine, Calif., and whose contents are expressly incorporated herein by reference.

Although the foregoing describes many of the functionalities of the symptomatic diagnostic system as being implemented on a smart phone app., it is also contemplated that the functionalities may be hosted by a website 25 accessible by the smart phone 14 or any other computing device. In this regard, the website 25 may host the vehicle decoder 22, the diagnostic database 16, and the symptomatic question database 28. Information may be communicated between the website 25 and the smart phone 14 via a cellular telephone network. Information received by the smart phone 14 from the website 25, such as the symptomatic questions, may be displayed on the smart phone 14. Furthermore, information received by the website 25 from the smart phone 14 may be analyzed and processed by the servers or databases hosting the website 25.

Figure 5:
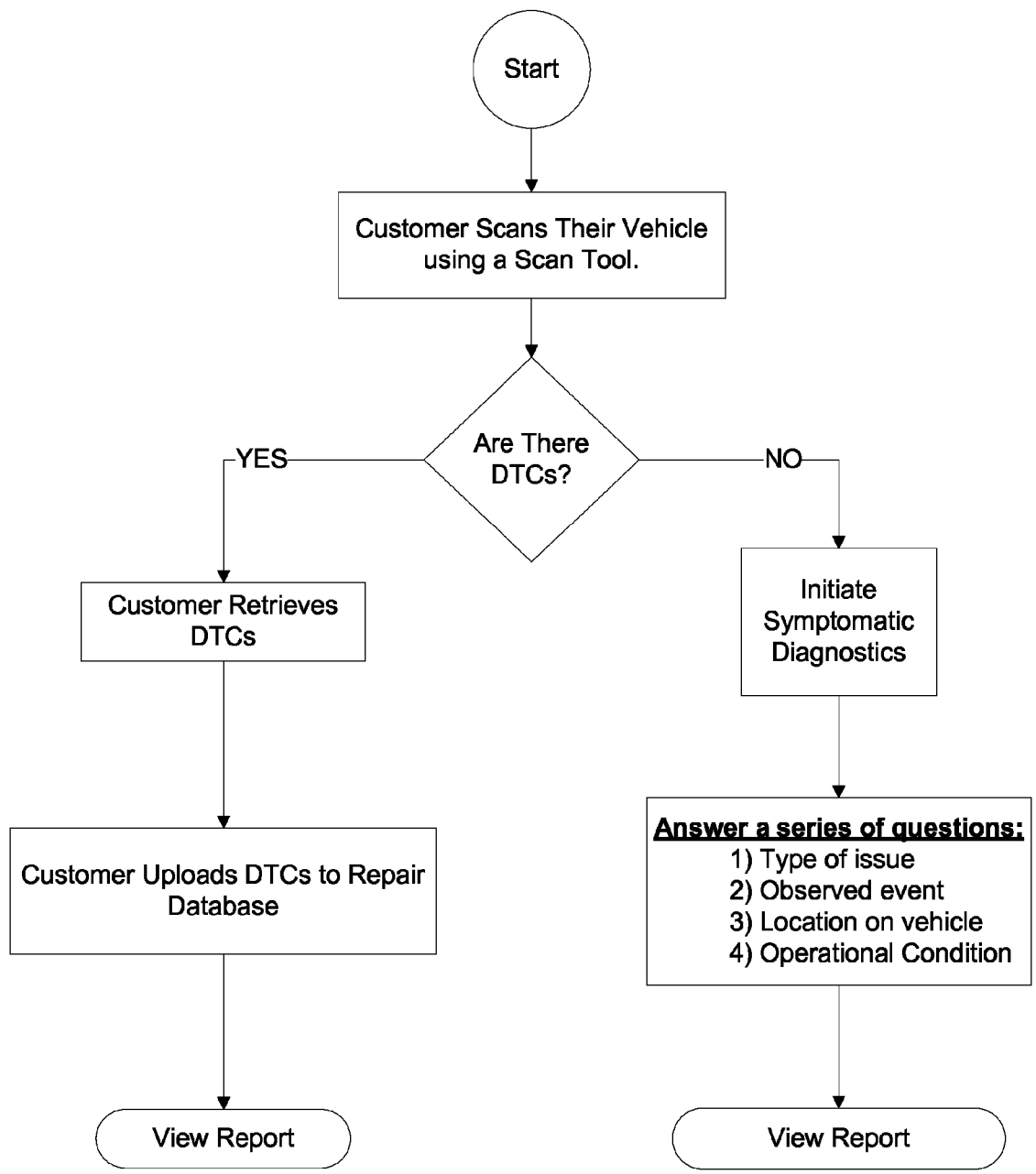
FIG. 5 is a flow chart of a multi-staged diagnostic process according to an embodiment of the present invention.

According to other embodiments of the present invention, and there is provided multi-staged diagnostic process which initially attempts to determine a diagnostic solution based on diagnostic trouble codes retrieved from the vehicle's onboard computer 47. FIG. 5 is a flowchart illustrating the multi-staged process, wherein the first stage proceeds when diagnostic trouble codes are present in the onboard computer 47, and the second stage proceeds when diagnostic trouble codes are not present in the onboard computer. In the second stage, symptomatic information is retrieved from the user and is analyzed to determine a diagnostic result. Thus, the absence of diagnostic trouble codes serves as a trigger for displaying the symptomatic question sequence. In this regard, the multi-staged diagnostic process allows a user to continue the diagnostic process when the user is experiencing problems with their vehicle, despite the absence of diagnostic trouble codes retrieved from the onboard computer 47.

The first stage of the process is a conventional diagnostic process wherein a scan tool 45 is placed in communication with the vehicle's onboard computer 47 to retrieve diagnostic trouble codes therefrom. When diagnostic trouble codes are received from the onboard computer 47, the diagnostic trouble codes are uploaded to a diagnostic database 16, which matches the trouble codes with a diagnostic solution. The diagnostic database 16 may be located remote from the scan tool 45, and thus, the scan tool 45 may be in communication with the diagnostic database 16 via an onboard communications circuit capable of communicating with the diagnostic database, or the scan tool 45 may be placed in communication with an intermediate device, such as a computer, smart phone, tablet computer, or the like, which is capable of receiving the information from the scan tool 45 and uploading the information to the diagnostic database 16.

The diagnostic database 16 receives the diagnostic trouble codes, analyzes the codes, and returns a diagnostic solution. For a more detailed discussion regarding the analysis of diagnostic trouble codes, please refer to U.S. Pat. No. 8,019,503, entitled Selective Access Process, and U.S. Pat. No. 8,370,018, entitled Method of Ranking Automotive Repair Solutions Associated with Automotive Diagnostic Data, both of which are owned by Innova Electronics Inc., and the contents of which are expressly incorporated herein by reference.

According to one embodiment, when no diagnostic trouble codes are received from or present in the onboard computer 47, the diagnostic process continues to a second stage, wherein symptomatic information is retrieved from a user via a hand held electronic device 14. Along these lines, it is understood that certain diagnostic conditions may not trigger a diagnostic trouble code, yet may cause drivability issues. The symptomatic information retrieved from the user may be useful for diagnosing the cause of the drivability issue. Therefore, while many conventional diagnostic processes would stop when no diagnostic trouble codes are retrieved from the onboard computer 47, various aspects of the present diagnostic process include a second stage which utilizes symptomatic information from the user to determine a diagnostic solution.

As used herein, the term "hand held electronic device" may refer to a smart phone, tablet computer, scan tool or similar hand held electronic devices having a display for displaying symptomatic questions to the user, as well as a user input to allow the user to enter symptomatic information into the hand held electronic device.

A set of computer executable instructions are downloaded onto the hand held computing device 14 for configuring the hand held electronic device 14 to perform a variety of functions. The computer executable instructions may include a smartphone application that is available for download from an application store or marketplace, such as the Apple App Store™ The computer executable instructions may be tailored for various operating systems, such as iOS™ by Apple™, the Android™ operating system, or other operating systems used by other hand held electronic devices, such as scan tools.

According to one embodiment, the computer executable instructions allow the hand held electronic device 14 to establish communication between the hand held electronic device 14 and the scan tool 45. Preferably, the communication between the hand held electronic device 14 and the scan tool 45 is wireless communication, although the communication may be wired communication without departing from the spirit and scope of the present invention.

The computer executable instructions further configure the hand held electronic device 14 to display the symptomatic question sequence for the user in response to an indication that there are no diagnostic trouble codes identified as being present in the onboard computer 47. Such an indication may include a signal sent from the scan tool 45 that the onboard computer 47 has been scanned, and that no diagnostic trouble codes were received from the onboard computer. In another implementation of the invention, the hand held electronic device 14 may be configured to communicate directly with the onboard computer 47, and thus, the hand held electronic device 14 may receive a signal directly from the onboard computer 47 that no diagnostic trouble codes are presently stored therein.

The symptomatic question sequence may relate to a variety of topics, such as the type of drivability issue experienced by the driver, the observed symptoms, the location of the vehicle, and the operational condition of the vehicle. Along these lines, the symptomatic question sequence may include a first question and a second question, wherein the content of the second question depending on user input received in relation to the first question. The symptomatic question sequence may be tailored to vehicle identification information associated with the vehicle (such as the YIN), or alternatively, the symptomatic question sequence may be more generic in nature. For a more detailed discussion of the symptomatic question sequence, please refer to the foregoing discussion.

The computer executable instructions further configure the hand held electronic device 14 to store the symptomatic data received from the user, and communicate the symptomatic data to the diagnostic database 16 or customer service center 18, as described above. In this regard, the hand held electronic device 14 may have communication capabilities which allow the device 14 to communicate with the diagnostic database 16. For instance, in the case of a smartphone, the smartphone 14 may communicate with a remotely located diagnostic database 16 via a wireless communication network.

As discussed in more detail above, the diagnostic database 16 includes diagnostic solutions matched with symptomatic data, wherein the diagnostic database 16 is configured to match symptomatic data received from the hand held electronic device with a diagnostic solution. After a diagnosis has been made, the diagnostic result may be communicated to the hand held electronic device 14 for display thereon.

The foregoing describes a diagnostic system which includes a scan tool 45 for scanning the vehicle's onboard computer, and a hand held electronic device 14 for retrieving symptomatic information from the user, communicating the symptomatic information to a diagnostic database 16 and displaying the diagnostic result. In this regard, the above-described system does not rely on the scan tool 45 for display or long-range communication capabilities (i.e., the ability to communicate with the diagnostic database 16), and instead relies on the hand held electronic device for such capabilities. However, it is contemplated that other embodiments of the diagnostic system include a scan tool 45 which also performs the functionalities described above as being associated with the hand held electronic device 14. Along these lines, the scan tool 45 may include a dedicated display screen capable of displaying the symptomatic question sequence and the diagnostic results. Furthermore, the scan tool 45 may also include a user input which allows a user to enter symptomatic information. In addition, the scan tool 45 may be capable of communicating with the diagnostic database 16. For instance, the scan tool 45 may include a WiFi module that allows the scan tool 45 to upload the symptomatic information via Internet through a locally accessible WiFi network. In that instance, a separate smartphone or tablet computer may not be needed.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A system for providing diagnostics for a vehicle having an onboard computer using a hand held electronic device, the system comprising:
   a scan tool disposable in operative communication with the onboard computer for retrieving diagnostic trouble codes therefrom;
   a diagnostic database having diagnostic solutions matched with symptomatic data; and
   a set of computer executable instructions downloadable onto a hand held electronic device for configuring the hand held electronic device to:
      establish communication between the hand held electronic device and the scan tool;
      display a symptomatic question sequence for the user when no diagnostic trouble code is received from the onboard computer;
      store symptomatic data received from the user; and
      communicate the symptomatic data to the diagnostic database;
   the diagnostic database being configured to match symptomatic data received from the hand held electronic device with a diagnostic solution.

2. The system recited in claim 1, wherein the computer executable instructions further configure the hand held electronic device to display a symptomatic question sequence that is customized in accordance with vehicle identification information associated with the vehicle.

3. The system recited in claim 2, wherein the scan tool is configured to retrieve vehicle identification information from the onboard computer.

4. The system recited in claim 2, wherein the hand held electronic device is configured to retrieve vehicle identification information from the vehicle.

5. The system recited in claim 4, wherein the hand held electronic device includes a camera configured to capture an image of at least one of a vehicle identification number (VIN) and a vehicle license plate, and wherein the hand held electronic device is loaded with a set of executable instructions operative to derive the vehicle identification information from the captured image.

6. The system recited in claim 4, wherein the hand held electronic device is a smart phone.

7. The system recited in claim 2, wherein the vehicle identification information includes a vehicle identification number.

8. The system recited in claim 2, wherein the vehicle identification information includes license plate information.

9. The system recited in claim 1, wherein the diagnostic database is disposed in the hand held electronic device.

10. The system recited in claim 1, further comprising a computer server, wherein the diagnostic database is located on the computer server.

11. The system recited in claim 1 wherein the symptomatic question sequence includes a first question and a second question, the content of the second question depending on user input received in response to the first question.

12. The system recited in claim 1, wherein the computer executable instructions further configures the smart phone to:
   receive information associated with the diagnostic solution from the diagnostic database; and
   display the information associated with the diagnostic solution.

13. The system recited in claim 12, wherein the information associated with the diagnostic solution includes a cost of repair statement.

14. The system recited in claim 1, wherein the computer executable instructions configure the hand held electronic device to establish wireless communication with the scan tool.

15. The system recited in claim 1, wherein the computer executable instructions configure the hand held electronic device to display the symptomatic question sequence for the user when diagnostic trouble codes are received from the onboard computer, the diagnostic database being configured determine the diagnostic solution based on an evaluation of diagnostic trouble codes and symptomatic data.

16. A system for providing diagnostics for a vehicle, the vehicle having an onboard computer capable of generating diagnostic trouble codes associated with various diagnostic conditions and retrievable from the vehicle, the system comprising:
- a diagnostic database having diagnostic solutions matched with symptomatic data; and
- a set of computer executable instructions downloadable onto a hand held electronic device for configuring the hand held electronic device to:
  - display a symptomatic question sequence for the user in response to an indication that there is no diagnostic trouble code have been identified as present in the onboard computer;
  - store symptomatic data received from the user; and
  - communicate the symptomatic data to the diagnostic database;
- the diagnostic database being configured to match symptomatic data received from the hand held electronic device with a diagnostic solution.

17. The system recited in claim 16, wherein the computer executable instructions further configure the hand held electronic device to display a symptomatic question sequence that is customized in accordance with vehicle identification information associated with the vehicle.

18. The system recited in claim 16, further comprising a computer server, the diagnostic database being located on the computer server.

19. The system recited in claim 16 wherein the symptomatic question sequence includes a first question and a second question, the content of the second question depending on user input received in response to the first question.

20. The system recited in claim 16, wherein the computer executable instructions further configures the hand held electronic device to:
- receive information associated with the diagnostic solution from the diagnostic database; and
- display the information associated with the diagnostic solution.

* * * * *